Figure 1:
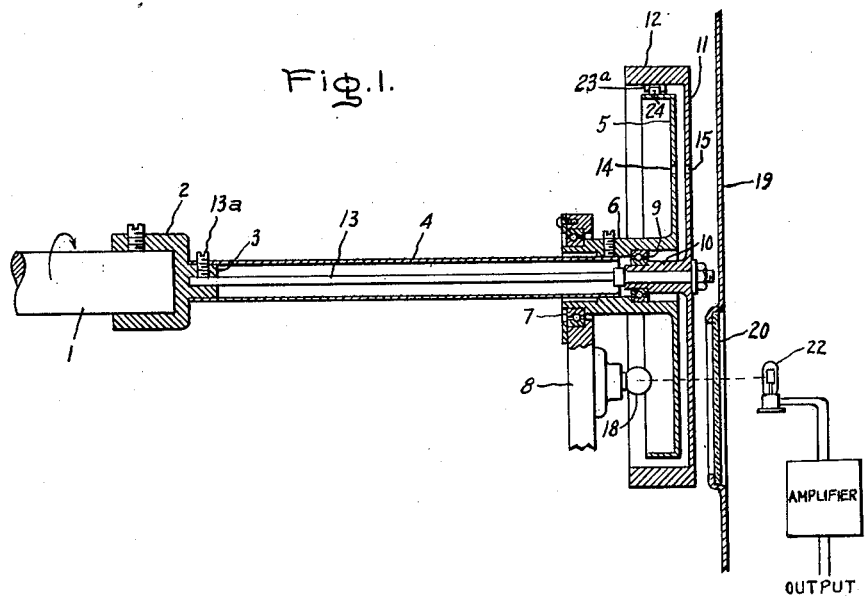

Dec. 18, 1951  E. C. VROOMAN  2,579,349
SPEED INDICATING DEVICE
Filed Dec. 21, 1946

Inventor:
Edward C. Vrooman,
by Prowell F. Mack
His Attorney.

Patented Dec. 18, 1951

UNITED STATES PATENT OFFICE

2,579,349

SPEED INDICATING DEVICE

Edward C. Vrooman, Schenectady, N. Y., assignor to General Electric Company, a corporation of New York Application December 21, 1946, Serial No. 717,666

7 Claims. (Cl. 264—12)

My invention relates generally to speed indicating devices and more particularly to improvements in apparatus for detecting and measuring changes in speed of a rotating member.

Although there are many forms of speed change indicators and speed measuring devices known in the mechanical and electrical arts, the detection and close measurement of small speed changes of relatively high speed rotating apparatus has always been a difficult problem. In order to insure maximum efficiency of high speed power plants, such as gas or other fluid power turbines, it is often desirable to maintain constant speed of such apparatus within very close limits. In addition, there are many applications where high speed rotating apparatus is used for testing purposes in which the speed of the prime mover or driving machine must be closely regulated and small speed changes, either accelerating or decelerating, must be instantly detected.

It is, therefore, an object of my invention to provide an improved speed sensitive device for rotating equipment.

It is a further object of my invention to provide an improved mechanical means for rapidly and accurately detecting and indicating small changes in speed of a rotating member.

It is a still further object of my invention to provide an improved speed indicating device that is compact, simple, and requires no maintenance or adjustment in order to insure accurate indications.

In carrying out my invention in one form, I provide a pair of circular indicating disks mechanically connected to the rotating shaft, the speed of which is to be controlled. One disk is rigidly connected to the rotating shaft and is formed of light-weight construction so that little or no inertia will be present to cause change of angular position of this disk with changes in shaft speed. The second disk, located in a plane parallel with the first disk, is connected to the rotating shaft by means of a torsion member, and due to the heavily-rimmed flywheel construction of the second disk considerable inertia is present, resulting in an angular lag in this disk when the speed of the driving shaft is changed. The greater windage of the flywheel rimmed disk also causes a sustained angular lag in this disk in an amount proportional to speed. Each disk is provided with a curved slot extending in a generally radial direction and making a small acute angle with a radius extending from the center of each disk. The preferably spirally curved apertures on each disk are curved in opposite directions from the center, and a light source may be placed behind the disks so that when viewed from the operating side and under high speed rotation, the slots will be coincident at one point only along a common radius giving the impression of a pin point of light to the observer. As the speed of the driving machine increases, the angular lag of the heavy disc, that is, the relative angular displacement of the disc, will increase, and the point of light will move outward from the center of rotation. Conversely, upon a decrease in driving speed, the angular lag will be decreased and the light indication will move inward. This light spot may be projected on a calibrated scale to read directly in R. P. M. or in per cent of the rated speed, or, if desired, may be picked up by a photo-electric device and thereby used in conjunction with well known photoelectric control apparatus to initiate speed corrective changes in the driving machine. A plurality of spirally curved apertures could be placed on each disc to give a greater number of indications at a given time and therefore afford greater accuracy.

Figure 2:
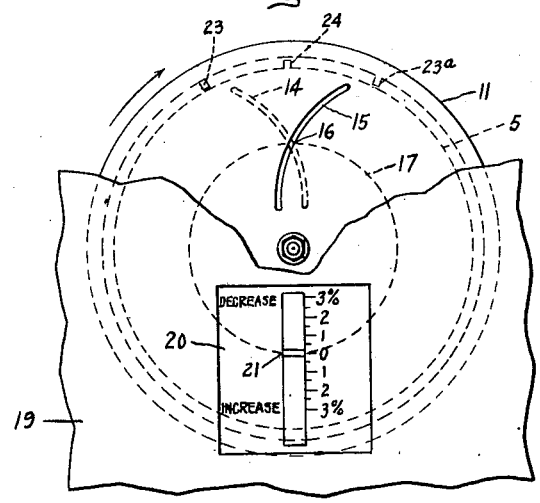

For a more complete understanding of my invention, reference should now be had to the drawing in which Fig. 1 is an elevational view in cross section of a speed indicating device built in accordance with my invention, and Fig. 2 is a composite end view of the device shown in Fig. 1.

Referring now to Fig. 1, I have shown my invention as applied for indicating speed variations of a rotating shaft 1, which may be the output shaft of a gas or other type of fluid turbine, an electric motor, or any other rotating apparatus whose speed it is desired to measure. Connected to the shaft 1 is a hub 2 having a shoulder portion 3 upon which is rigidly secured a hollow tubular shaft 4. At the outer end of the shaft 4, a light-weight inner disk 5 is mounted by means of the hub member 6. The shaft 4, disk 5 and hub 6 are maintained in correct alignment with the shaft 1 by means of the anti-friction bearings 7 carried by the support 8. The structure consisting of the light-weight disk 5, hub 6 and hollow shaft 4 is designed to have as small inertia as possible, and the shaft 4 is, therefore, necessarily made as stiff and rigid as possible so that there will be no appreciable angular lag between the disk 5 and driving shaft 1 under rotation at high speed. Supported on a second set of anti-friction bearings 9 within hub 6 is a second hub 10 to which is secured a second or outer disk 11. The outer disk 11 is constructed with a heavy rim portion 12 approximating a flywheel construction and overhanging the light disc 5, and the entire assembly consisting of the hub 10, disk 11 and weighted rim 12 is driven from the rotating shaft 1 by means of the slender torsional shaft 13 which is concentrically disposed within the rigid tubular shaft 4. The shaft 13 is also connected to the driving shaft 1 by means of a central bore in the hub member 2 and set screw 13a. Thus, it will be seen that this assembly consists of the inner torsional shaft 13 and the weighted flywheel disk 12 mounted at its outer end comprising an inertia element which coupled with the effect of wind resistance on the flywheel will cause an angular displacement or twist of the shaft 13 with respect to the shaft 4 which is proportional to speed of the driving shaft 1, thereby resulting in a relative angular positional displacement of the disk 11 with respect to the disk 5. In order to prevent oscillation of the torsion shaft 13 and disk 11, damping means may be employed such as a bimetallic torsion shaft 13, coating the shaft with deadening material or the use of a dampening fluid between the shaft 13 and tubular member 4. Another means is the design of the shaft 13 so that its natural frequency lies outside of the working range of the device.

In order to detect the amount of the angular lag between the outer disk 11 and the inner disk 5, a generally radial curving slot or aperture 14 is provided in the inner disk 5 and a second generally radial slot or aperture 15, curving in the opposite direction, is provided in the outer disk 11. Each curved aperture is preferably spirally curved and makes a small acute angle with a radius extending from the center of each disk. This is best shown by reference to Fig. 2 which shows an end view of the device of Fig. 1, and it should be assumed that the position of the disks as shown, wherein the slots 14 and 15 are coinciding at the point 16, is representative of the angular position of the respective disks during rotation at constant rated speed. Thus, to the eye of the observer looking at the device, as in Fig. 2, the intersection point 16 of the slots, if illuminated from a light source behind the disks, would appear as a narrow concentric ring of light as represented by the dotted line 17 in Fig. 2.

In order to quantitatively measure the deviation in speed from constant or rated value, a light source 18 is mounted behind the disks 5 and 11 on the support member 8. The shield member 19 for the device is provided with a window or aperture in which a glass screen 20, which may be a conventional ground glass screen, is secured. As shown in Fig. 2, the glass screen 20 may be inscribed to provide a calibrated scale for indicating either per cent of speed change from the normal value, or may be calibrated directly in revolutions per minute or per second of the driving shaft.

If it is assumed that the driving shaft 1 is rotating at constant rated speed, the angular position of the disks should be adjusted so that the point of light formed by intersection of the slots 14 and 15, is projected on the screen and falls at the point 21 on the graduated scale. Any increase in speed of the driving member 1 will instantly accelerate the light-weight inner disk 5 but, due to the relatively greater inertia of the outer disk 11 and flywheel rim 12, additional power will be required to be transmitted by the torsional shaft 13, thus resulting in greater twist of the shaft and an increased position of angular lag of the outer disk 11 behind the inner disk 5. This greater lag will be maintained by the increased windage at the higher speed, the heavy flywheel rim 12 being exposed to windage and the light disc 5 being nested within the rim 12 and thus not subject to any appreciably increased windage at higher speed.

If it is assumed that the disks are rotated in a clockwise direction, as viewed in Fig. 2, this increased lag in the outer disk 11 will result in the point of intersection 16 of the slots moving outward from the center by an amount directly proportional to the change in speed. Conversely, if the speed of the driving member 1 decreases below the normal or rated value, less power will be required to be transmitted by the torsional shaft 13, and the amount of angular lag between the outer disk 11 and inner disk 5 will decrease resulting in the point of light 21 moving inward as viewed in Fig. 2 and thus indicating a decrease in driving speed. As shown in Fig. 2, this decrease or increase can readily be taken off of the calibrated screen by an observer positioned in front of the indicating device.

A variety of other means may be used to take advantage of the speed change indication presented by my device. For example, in Fig. 1, I have shown a conventional photoelectric tube 22 which may be placed in front of the calibrated screen in the position where the observer would be. The phototube can be arranged so that it will be energized by light from the source 18 only when the point of light 21 falls exactly on the rated speed mark. If the speed of the driving motor 1 then changes, the point of light will move away from the rated value, thus deenergizing the photoelectric cell and giving an electrical indication which may be transmitted to any other location, or it may be used to initiate operation of associated control equpment to restore speed of the driving member to the correct value.

It will be apparent to anyone skilled in the art that a number of other known control systems may be adapted for use in conjunction with my device so that speed change information can be transmitted to a remote point. By use of a timer driven roll of photographic sensitized paper, a chronological record over a period of time may be made, or, as previously mentioned, control apparatus may be energized to provide corrective action on the prime mover or driving means for the rotating shaft 1.

In order to limit the angular twist of the shaft 13 to safe values under rapid acceleration and deceleration, a pair of stops or limits 23 and 23a may be provided on the inner surface of the flywheel rim 12 for cooperation with a stop or limit 24 extending from the rim of the disk 5, as shown in Fig. 2. By means of these limit stops mechanical damage to the torsion shaft 13 will be prevented.

The entire shield 19 in front of the discs may be made of translucent material, or may be treated with suitable fluorescent material, and the light source 18 made co-extensive with the entire area of the disc 5, in which case the light point 16 will trace a complete circle 17 under constant speed conditions. If the prime mover driving shaft 1 is an internal combustion engine, for example, the power impulses will be observed as slight speed changes, thereby distorting the trace 17 in a symmetrical manner depending on the number of cylinders and cycle of the engine. By this arrangement, the torque versus time pattern of the engine may be traced and studied, or can be photographed for future reference.

From the foregoing it can be seen that my invention comprises an extremely simple, compact and accurate device for giving measurement and indication of rotating speed as well as giving the indication and measurement of acceleration or deceleration of a driving member. A minimum of equipment is required, and once the device has been initially adjusted for correct indication, little or no maintenance is required to keep the device in working condition and to maintain its inherent accuracy.

While I have shown and described my invention as applied to a particular system and embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent in the United States is:

1. A speed responsive device for a rotating shaft comprising, a first disk connected to said shaft by a torsionally resilient coupling and having an overhanging flywheel rim of relatively large mass, said first disk being exposed to the effect of windage as said shaft rotates, and a second disk of relatively small mass rigidly connected to said shaft and located adjacent said first disk in substantially parallel relation therewith, the rim of said second disk being nested within said overhanging rim, whereby said second disk is protected against variation in windage as the speed of said shaft changes and said disks are relatively angularly displaced by windage on said first disk and in an amount substantially proportional to speed.

2. A speed indicating device for a rotating shaft comprising, a first disk connected to said shaft by a torsionally resilient coupling and having an overhanging flywheel rim of large mass, a second disk of small mass rigidly connected to said shaft and located adjacent said first disk in substantially parallel relation therewith, the rim of said second disk being nested within the overhanging rim of said first disk, and visual indicating means for detecting relative angular displacement of said disks during rotation of said shaft, said overhanging rim minimizing torsional vibration of said second disk during rotation of said shaft.

3. A speed indicating device for a rotating shaft comprising, a first disk connected to said shaft by a torsionally resilient coupling and having an overhanging flywheel rim of large mass, and a second disk of small mass rigidly connected to said shaft and located adjacent said first disk in substantially parallel relation therewith, the rim of said second disk being nested within said overhanging rim, each of said disks being slotted and said slots intersecting and being oppositely angularly disposed with respect to a common radius through their point of intersection, thereby to form a viewing aperture variably positioned along said common radius in accordance with the relative angular displacement of said disks.

4. A speed indicating device for a rotating shaft comprising, a first disk connected to said shaft by a torsionally resilient coupling and having an overhanging flywheel rim of large mass, a second disk of small mass rigidly connected to said shaft and located adjacent said first disk in substantially parallel relation therewith, the rim of said second disk being nested within said overhanging rim, whereby said disks are relatively angularly displaced by wind friction on said first disk and in an amount substantially proportional to the speed, each of said disks being slotted and said slots intersecting and being oppositely angularly disposed with respect to a common radius through their point of intersection, thereby to form a viewing aperture variably positioned along said common radius in accordance with the relative angular displacement of said disks, and means for projecting a beam of light through said viewing aperture, thereby to indicate by the radial position of said viewing aperture the speed of said shaft.

5. A speed indicating device for a rotating shaft comprising, a first circular disk connected to said shaft by a torsionally resilient coupling comprising an elongated shaft member connected to the end of said rotating shaft, an overhanging flywheel rim of relatively large mass positioned around the perimeter of said first disk, a second circular disk of relatively small mass located adjacent said first disk in substantially parallel relation therewith and rigidly connected to said rotating shaft by a tubular shaft member positioned in coaxial relation with said elongated shaft member, the rim of said second disk being nested within said overhanging rim whereby said disks are relatively angularly displaced by wind friction upon said flywheel rim in an amount substantially proportional to speed, each of said disks being slotted and said slots intersecting and being oppositely angularly disposed with respect to a common radius through their point of intersection thereby to form a viewing aperture variably positioned along said common radius in accordance with the relative angular displacement of said disks, a stationary source of radiation positioned to project energy through said viewing aperture at one circumferential position thereof, and means responsive to said radiation and disposed in the path of energy traversing said aperture to detect the radial position of said aperture during rotation of said shaft.

6. A speed indicating device for a rotating shaft comprising, a first disk of relatively large mass having an overhanging peripheral portion connected to said shaft by a torsionally resilient coupling and exposed to the effect of windage as said shaft is rotated, a second disk of relatively small mass rigidly connected to said shaft and disposed in substantially parallel spaced relation with said first disk, said second disk being sheltered from the effect of windage by said overhanging portion of said first disk, and visual indicating means for detecting relative angular displacement of said disks during rotation, thereby to measure the speed of said shaft.

7. A speed indicating device for a rotating shaft comprising, a first circular disk of relatively large mass connected to said shaft by a torsionally resilient coupling, an overhanging portion around the perimeter of said first disk, a second disk of relatively small mass rigidly connected to said shaft and disposed in substantially parallel spaced relation with said first disk, the rim of said second disk being nested within said overhanging portion and thereby protected from the effect of windage as the shaft is rotated, each of said disks being slotted and said slots intersecting and being oppositely angularly disposed with respect to a common radius through their point of intersection, thereby to form a viewing aperture variably positioned along said common radius in accordance with the relative angular displacement of said disks, and means for projecting a beam of light through said viewing aperture, thereby to indicate by the radial position of said viewing aperture the speed of said shaft.

EDWARD C. VROOMAN.

REFERENCES CITED

The following references are of record in the file of this patent:

UNITED STATES PATENTS

| Number | Name | Date |
|---|---|---|
| 1,568,544 | Chilton | Jan. 5, 1926 |
| 2,219,298 | Dashefsky | Oct. 29, 1940 |
| 2,363,611 | Newell | Nov. 28, 1944 |

FOREIGN PATENTS

| Number | Country | Date |
|---|---|---|
| 218,674 | Switzerland | Apr. 16, 1942 |